United States Patent [19]

Serrano

[11] 4,243,083
[45] Jan. 6, 1981

[54] BORING ATTACHMENT FOR RADIAL ARM SAWS

[76] Inventor: Anthony B. Serrano, 1924 Margaret St., San Jose, Calif. 95116

[21] Appl. No.: 10,325

[22] Filed: Feb. 8, 1979

[51] Int. Cl.³ .................... B27B 5/00; B27C 3/02
[52] U.S. Cl. .................... 144/35 A; 269/87.3; 269/94; 269/157; 279/99; 408/20; 408/72 B; 408/103; 408/202
[58] Field of Search ............ 269/55, 56, 86, 87, 269/87.1, 87.3, 135, 157, 165, 172, 291, 94; 144/35 R, 35 A, 92, 323; 29/650; 279/7, 99; 408/72, 88, 103, 109, 202, 26, 28, 29, 20

[56] References Cited

U.S. PATENT DOCUMENTS

| 2,260,784 | 10/1941 | Morton | 408/103 |
| 2,740,308 | 4/1956 | Blanchard | 408/72 |
| 2,896,955 | 7/1959 | Treppard | 279/99 X |
| 2,961,900 | 11/1960 | Stanton et al. | 269/87.3 X |
| 3,695,318 | 10/1972 | Maury | 144/35 R |
| 4,174,917 | 11/1979 | Brower | 269/58 X |

Primary Examiner—W. Donald Bray
Attorney, Agent, or Firm—Thomas Schneck

[57] ABSTRACT

An attachment kit is disclosed for converting a standard radial arm saw to a horizontal drill press. The kit includes a drill holder that attaches to the arbor of the radial arm saw's motor, a drill, a work support platform for holding a workpiece at a correct height and a work holder assembly for holding the workpiece to the upper surface of the work support platform.

2 Claims, 4 Drawing Figures

BORING ATTACHMENT FOR RADIAL ARM SAWS

BACKGROUND OF THE INVENTION a. Field of the Invention

This invention relates generally to attachments or conversions for saws and more particularly to attachments for saws which will allow a saw to perform drilling operations.

b. Prior Art

Radial arm saws are versatile woodworking machines often found at construction sites and in home workshops. A radial arm saw typically includes a horizontal work support table, a vertical column rising from the support table, and a support arm having ways which guide a motor along the length of the arm. The motor is provided with a threaded arbor to which a circular saw blade may be attached. The axis of rotation of the arbor is normally parallel to the work support table but, depending on the orientation of the motor, may attain various angular relationships.

It has been recognized by various persons that the radial arm saw can be adapted or converted so as to perform many different functions, such as drilling or routing. Such an adaption usually involves removing the circular saw blade from the arbor and replacing it with some type of bit holder.

U.S. Pat. Nos. 2,621,686 of J. E. Tompkins, 2,672,170 of A. C. Johnson, 2,811,182 of D. D. Beale et al., and 3,586,079 of W. A. Collins et al., all serve as examples of radial arm saw conversions. For instance, in Thompkins' patent a radial arm saw that can be converted into a vertical drill press is disclosed. In Johnson's patent, a radial arm saw is disclosed which includes a motor that can be turned so as to be vertically disposed for vertical milling operations. Beale et al. disclose a radial arm power tool which again can be used as either a radial arm saw or as a vertical drill press.

The invention of Collins et al. is interesting in that a standard radial arm saw is used to perform both sawing and drilling operations. Collins et al. accomplished this by mounting a conventional radial arm saw upon a specially built mounting base which supports the radial arm saw vertically for sawing operations and which supports it horizontally for drilling operations.

It is apparent from a viewing of the disclosures of Thompkins, Johnson and Beal et al. that there are many types of specialized apparatus which can perform the dual functions of a radial arm saw and a vertical drill press. Such devices are relatively complex and expensive.

The device disclosed in the patent of Collins et al., on the other hand, makes use of a standard and commercially available radial arm saw that is attached to a specially built table that adapts the saw for use as either a saw or as a vertical drill press.

SUMMARY OF THE INVENTION

It is an object of this invention to provide an attachment for radial arm saws which will allow an operator of the say to also perform drilling operations.

Another object of this invention is to provide such an attachment that can be used with standard and commercially available radial arm saws.

A still further object of this invention is to provide such an attachment that is inexpensive, reliable and easy to use.

Briefly, the invention comprises a drill holder, an adapter for coaxially attaching the drill holder to the motor arbor of a radial arm saw, a rotary drill mounted in the drill holder, and a work support platform. A workpiece is supported upon the platform and the drill directed into the workpiece.

An advantage of this invention is that it is quite simple in construction, thus making it an inexpensive attachment for standard radial arm saws.

A further advantage of this invention is that, since it is a horizontal type drill press, the natural horizontal orientation of the motor of the radial arm saw need not be changed, thus providing for an extremely quick and simple drill press conversion.

DESCRIPTION OF THE PREFERRED EMBODIMENT

Figure 1:
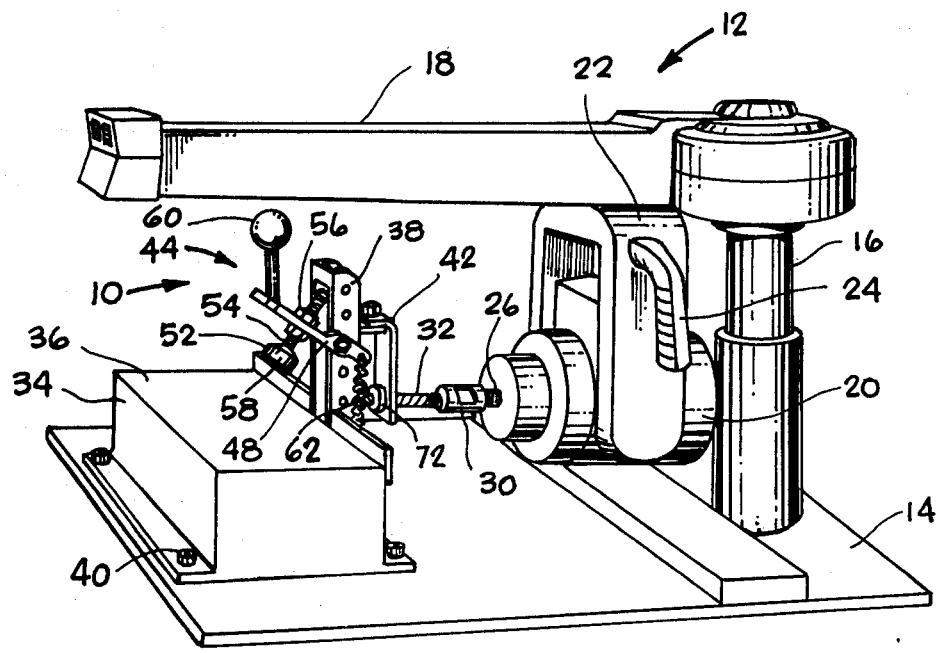
FIG. 1 is a perspective view of a standard radial arm saw and an attachment therefor in accordance with the present invention.

In FIG. 1, an attachment 10 in accordance with the present invention is shown with a standard radial arm saw 12 having a work support table 14, an adjustable column 16, a radial arm 18 attached to the top of the column so as to be horizontally disposed over the work table, and a motor 20 slidably attached to ways (not seen) of the radial arm by a bracket 22. The motor may travel along the length of the arm by pulling on a handle 24 that is attached to bracket 22.

A threaded arbor 26 extends from one end of motor 20 and is the motor driven spinner member. The arbor typically has an axis of rotation that is parallel to the surface of work support table 14 and may be positioned so as to be further parallel with the ways of radial arm 18. When the arbor is so positioned, the radial arm saw is ready to be used as a horizontal drill press with the attachment of the present invention. Attachment 10 includes an adaptor 30 which at one end is connected to the saw arbor and at the opposite end receives the threads of a drill bit. Further included in the attachment of this invention is a work support platform 34 having a work support surface 36 and an upright post 38 that is attached to a side of the work support platform. The platform itself may be mounted on work table 14 by means of a plurality of screws 40, or other fasteners.

Post 38, which is attched to platform 34 substantially perpendicularly to work support surface 36, supports both a bracket 42 and a work holder assembly 44. Bracket 42 is an inverted L-shaped member having one end attached to the support post and having its free end extending downwardly towards drill 32. The free end of the bracket is bifurcated so as to engage with a sleeve 72 which is attached around the drill.

Figure 3:
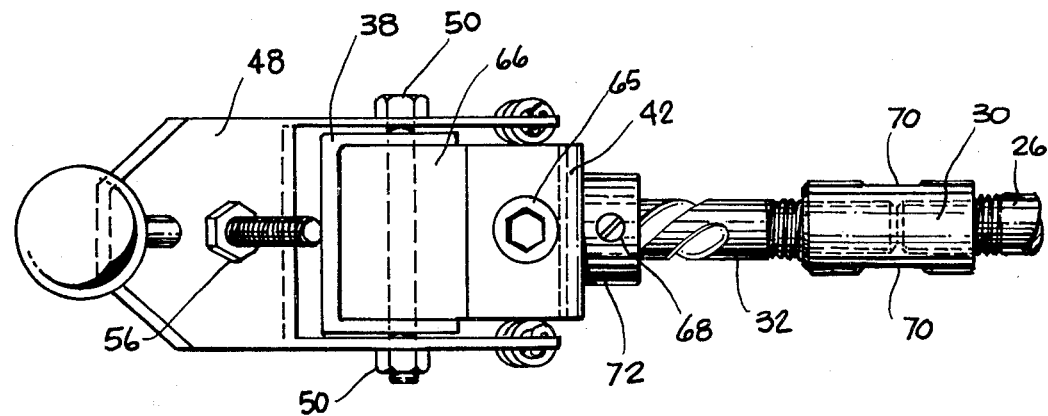
FIG. 3 is a top plan view of the attachment alone.

Work holder assembly 44 includes an elongated bracket-lever 48 that is pivotally attached to post 38 by one or more bolts 50 (see also FIG. 3). A clamping member 52 is adjustably attached to bracket-lever 48 by means of a threaded stud 54 and a pair of nuts 56.

Clamping member 52 presents a bearing surface 58 for pressing against the top of a workpiece. Also attached to bracket-lever 48 is a lever-handle 60 that is used to press member 52 down against the workpiece. Work holder assembly 44 is biased in an upright position by means of a spring 62.

Figure 2:
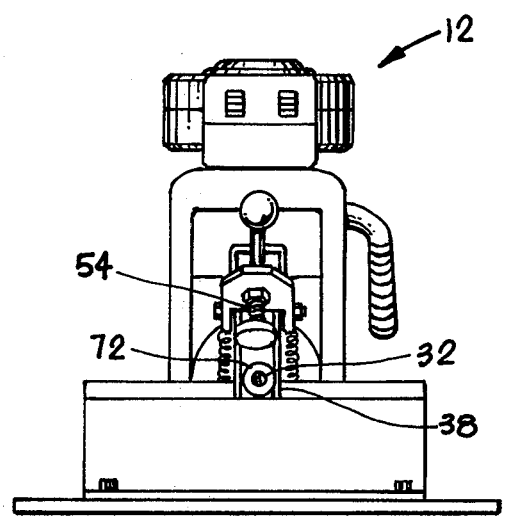
FIG. 2 is an end view of the saw and attachment shown in FIG. 1.

Referring now to FIG. 2, it may be seen that post 38 is provided with an elongated slot 64 through which drill 32 can extend. Sleeve 72 is shown to have a sufficiently large diameter such that it cannot pass through the slot, thus providing an adjustable limit for the forward motion of the drill.

In the top plan view of FIG. 3 it can be seen that support post 38 is preferably constructed from channel stock material. Bracket 42 is attached to post 38 by means of a nut and bolt combination 65 which clamps it to a tongue of material 66 that is permanently attached to post 38. Sleeve 72 can be seen to be attached to drill 32 by means of a set screw 68.

Also in FIG. 3 it may be seen that adaptor 30 has a pair of indented surfaces 70 so that it can be easily gripped by a wrench or the like for removal from the arbor and chuck. On one end the adaptor 30 has reverse threads for mating with the threads of the arbor. On the opposite end the adaptor 30 has reverse threads for mating with threads of a reverse thread drill bit. A chuck may be modified for use with the arbor if threaded bits are not used.

In operation, the boxlike construction of support platform 34 in FIG. 1 provides for a strong, yet lightweight work support surface. The height of work support surface 36 of platform 34 above support table 14 corresponds to the lower limit of the drill elevation as set by the radius of motor 20 as it abuts the upper surface of work support table 14. The height of the drill itself can be varied by means of an elevation adjustment on bracket 22 that is provided in all standard radial arm saws.

Figure 4:
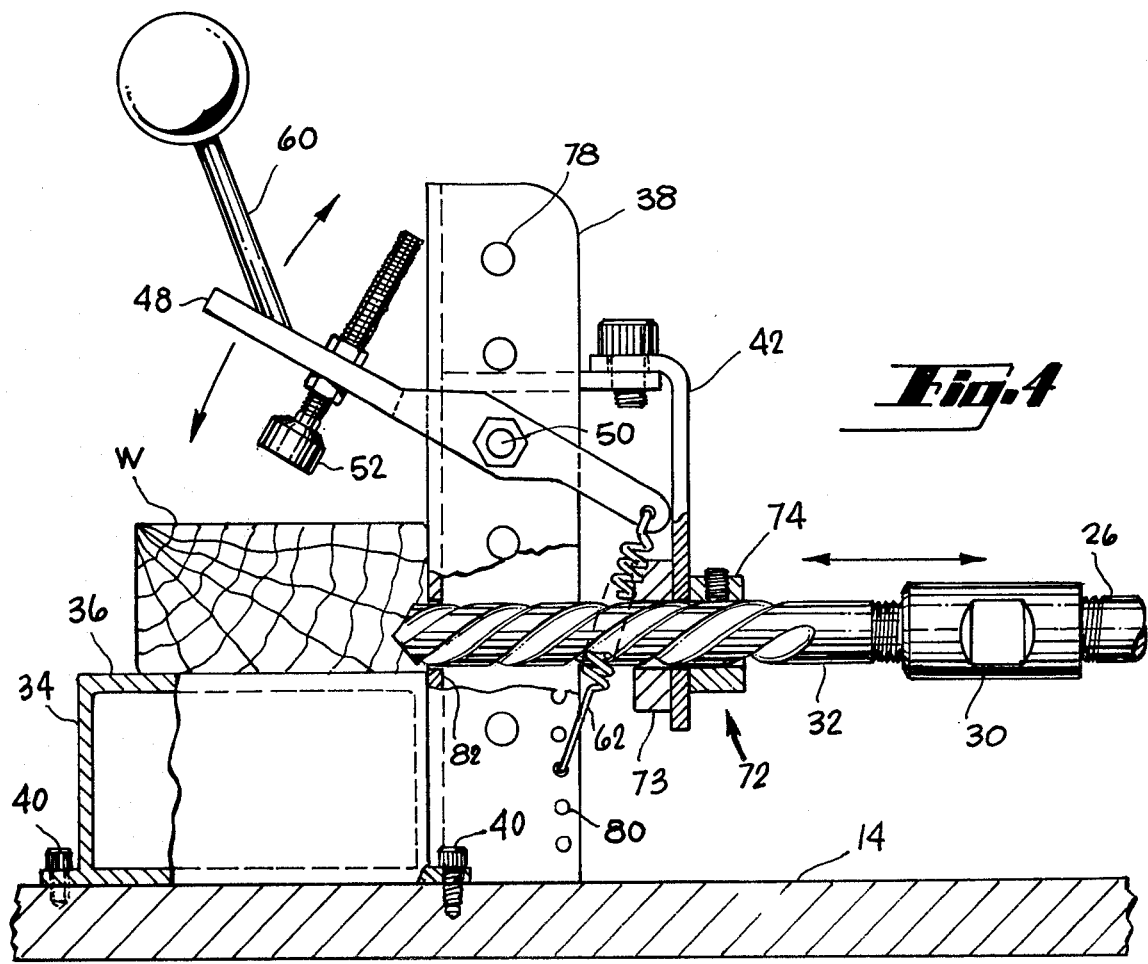
FIG. 4 is a partially cut away side elevational view of the attachment shown in FIG. 3.

As can be most clearly seen in FIG. 4, drill 32 mounts the sleeve 72 which comprises a first forward collar 73 which is a bearing and a second rearward collar 74 press fit inside of the first collar. Collar 73 is of a large enough outer diameter so that it will not slide through the bifurcated end of bracket 42 and thus it acts as a stop limiting the rearward motion of drill bit 32. Collar 73 also limits the forward motion of the drill against post 38. The second collar 74 may be positioned by means of set screws to set the forward and rearward travel of sleeve 72 into and out of the work.

As also seen in this figure, adapter 30 is provided with a pair of axial bores which receive the ends of arbor 26 and the threaded end of a drill bit. The drill bit or any chuck connected to the arbor is given a reverse thread so that as the arbor is spun, it tends to tighten within the adapter and also tends to tighten the adapter onto the chuck.

It may be noted that post 38 is provided with a plurality of large holes 78. These holes allow bracket 48 to be adjustably positioned vertically along the post to allow for different thicknesses of material. Likewise, the post is provided with a plurality of smaller diameter holes 80 into which an end of spring 62 may be disposed to vary the biasing tension on the work holder assembly.

A workpiece W is placed upon work support surface 36 so that its forward edge abuts post 38 and a fence 82, used for alignment, although not necessary. Then, with his left hand, an operator presses downwardly on lever-handle 60 to force a wooden holder member 52 against the workpiece. Wood is selected for clamping member 52 for safety considerations in the event the member is struck by the drill bit. A piece of abrasive material is adhesively secured to the bottom of the holder to provide friction between the holder and the workpiece. The operator then pulls forwardly on handle 24 of the radial arm saw to cause drill 32 to contact and enter the workpiece. The clamping action of the work holder assembly can be varied by adjusting the holder member 52 or by adjusting the height of the assembly relative to post 38. The depth of the drilling operation can be varied by adjusting collar 74 along drill 32 to the desired position. The height of the drill hole in workpiece W is, as mentioned earlier, adjusted by varying the height of motor 20 relative to work support table 14 by means of its adjustable attachment to bracket 22.

What is claimed is:

1. A conversion kit for modifying a radial arm saw for use as a boring tool comprising,
    adapter means attachable to a saw arbor of a radial arm saw for holding a drill for rotation by said arbor, the radial arm permitting axial movement of the drill,
    a workpiece engaging means for securing a workpiece in a position for drill communication with the drill, said workpiece engaging means including a workpiece support surface held by an upright platform,
    an upright post attached to said platform, substantially perpendicular to said workpiece support surface, said post being provided with a longitudinal slot for passing a drill therethrough,
    collar means axially affixed about said drill, and
    bracket means attached to said post and having a bifurcated end portion for passage of said drill therethrough, said collar means being restrained by said bracket means when the drill is axially moved to a desired limit position.

2. A kit as recited in claim 1 wherein
    said collar means is disposed on a side of said drill relative to said bracket means so that rearward axial motion of the drill relative to the bracket means is limited.

* * * * *